Figure 1:
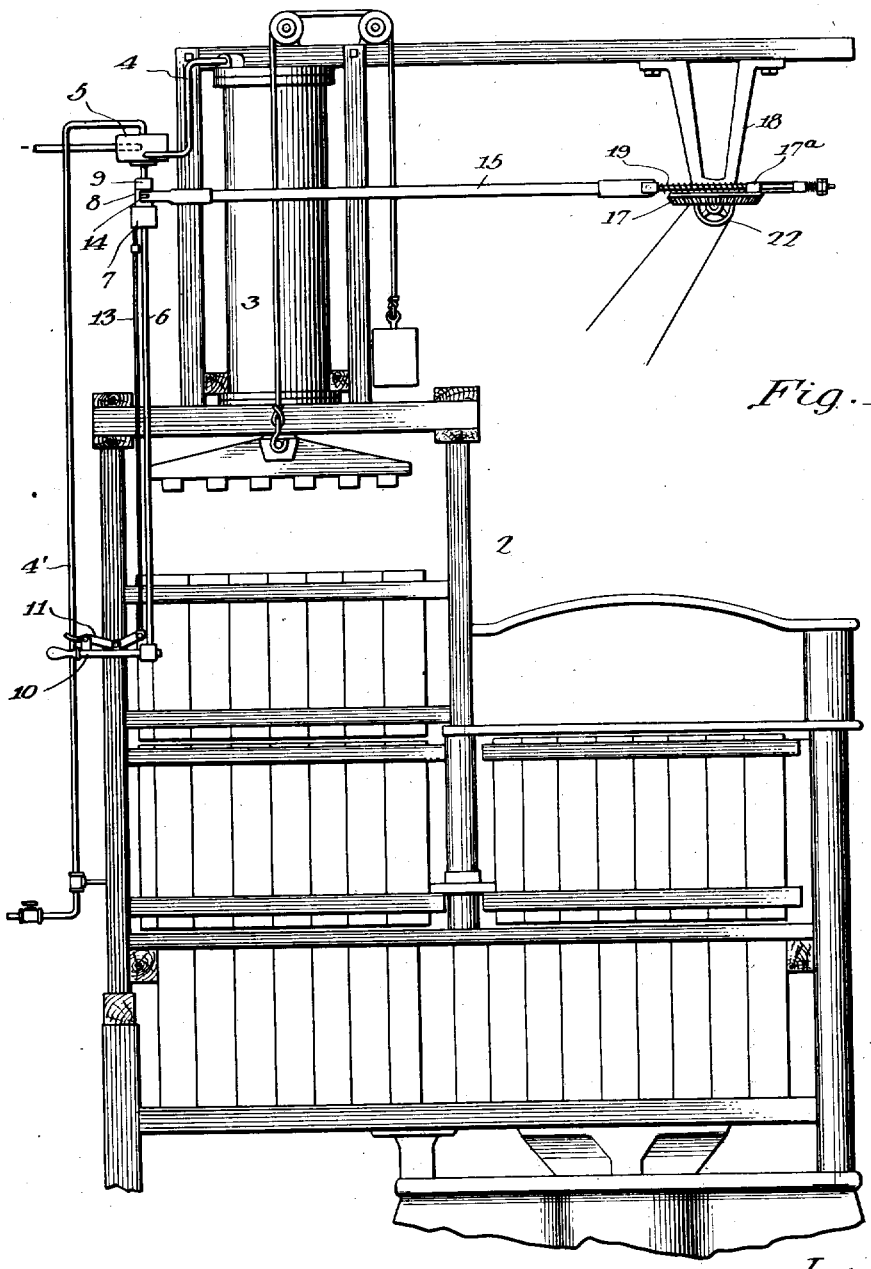

N. W. L. BROWN.

TRAMPER FOR COTTON PRESSES.

APPLICATION FILED FEB. 16, 1914.

Reissued Mar. 24, 1914.

13,705.

3 SHEETS—SHEET 1.

Witnesses:
Marian J. Brown
Leila P. Power.

Inventor:
Nimrod W. L. Brown

COLUMBIA PLANOGRAPH CO., WASHINGTON, D. C.

N. W. L. BROWN.
TRAMPER FOR COTTON PRESSES.
APPLICATION FILED FEB. 16, 1914.
Reissued Mar. 24, 1914.
13,705.
3 SHEETS—SHEET 2.
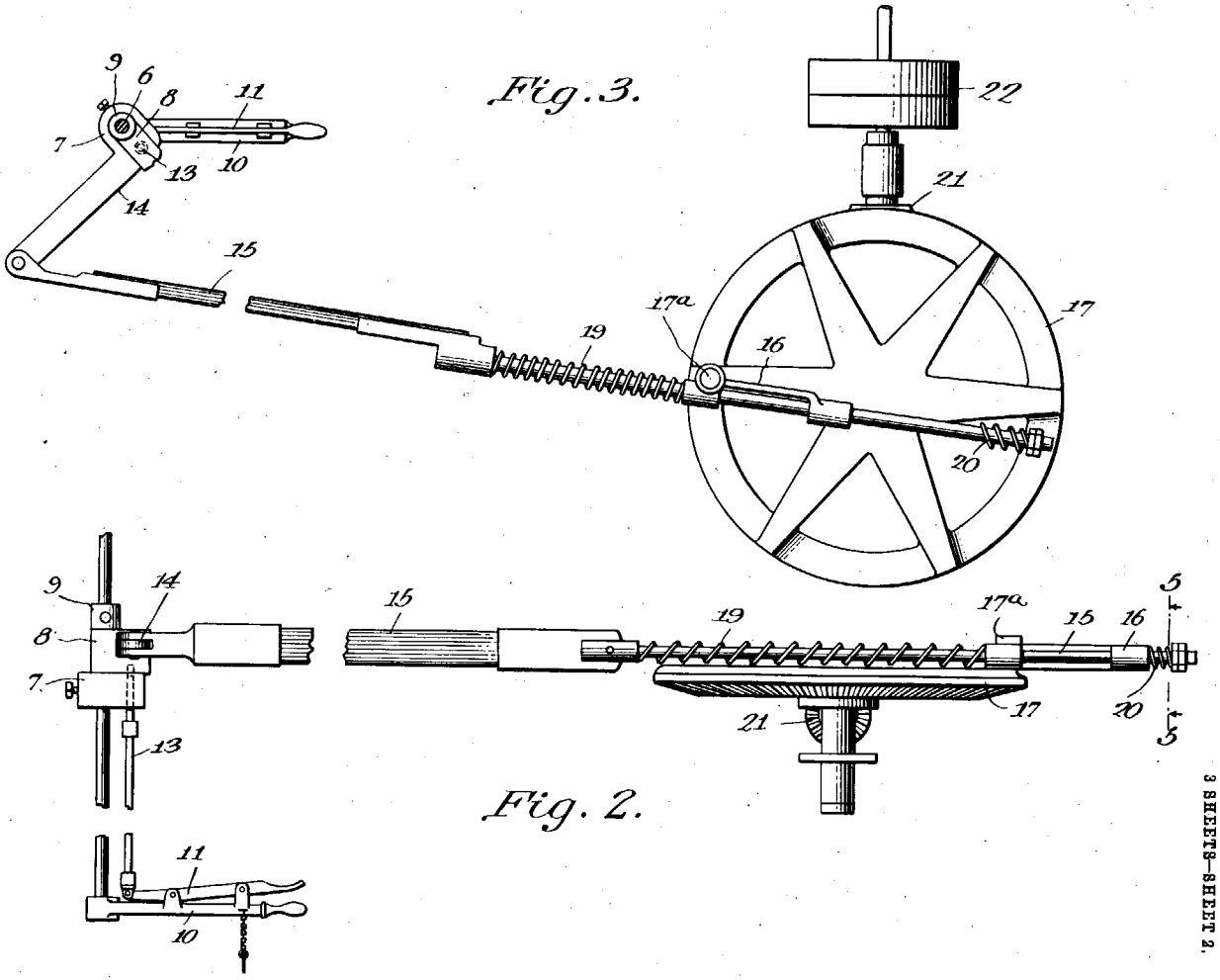
Witnesses:
Marian J. Brown
Leila P. Power
Inventor:
Nimrod W. L. Brown
COLUMBIA PLANOGRAPH CO., WASHINGTON, D. C.

N. W. L. BROWN.
TRAMPER FOR COTTON PRESSES.
APPLICATION FILED FEB. 16, 1914.
Reissued Mar. 24, 1914.
13,705.
3 SHEETS—SHEET 3.
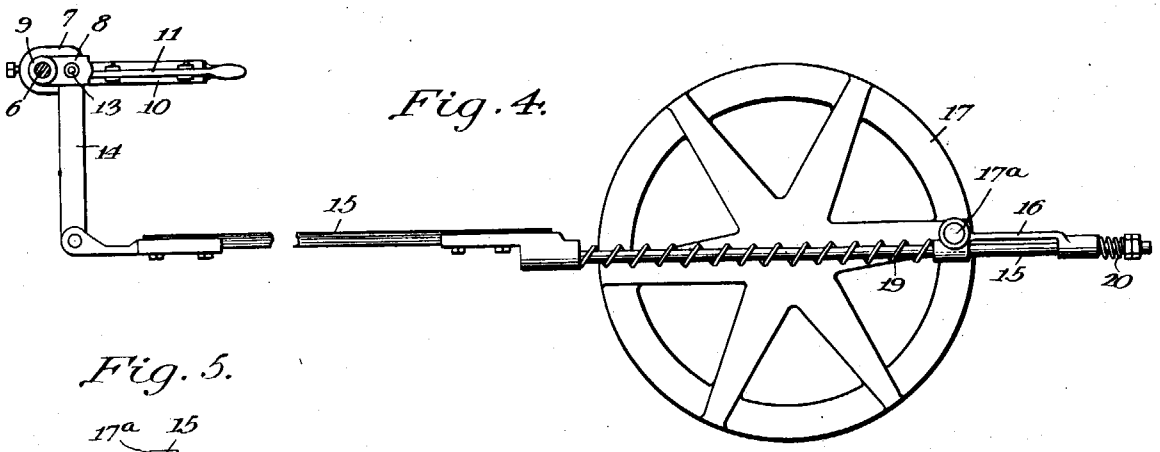
Fig. 4.
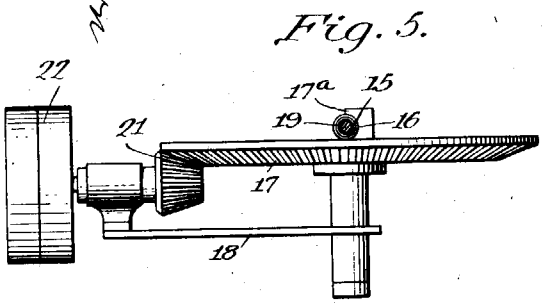
Fig. 5.
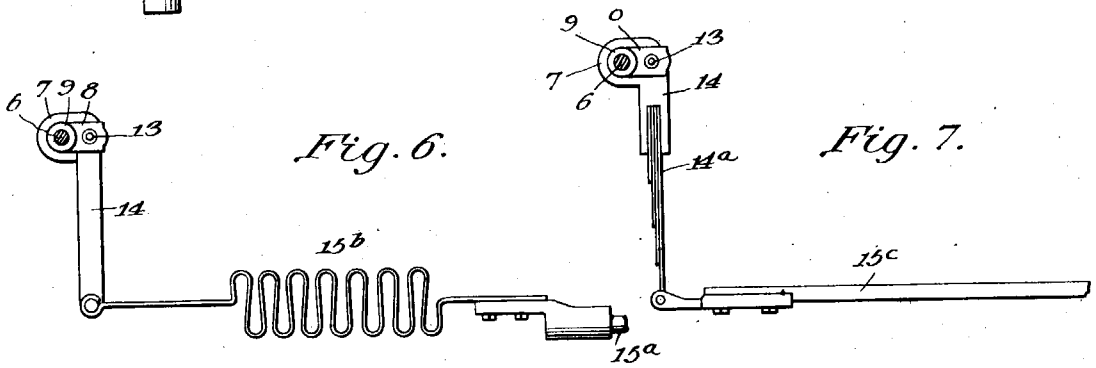
Fig. 7.
Fig. 6.
Witnesses:
Marian J. Brown
Leila P. Power
Inventor:
Nimrod W. L. Brown
COLUMBIA PLANOGRAPH CO., WASHINGTON, D. C.

UNITED STATES PATENT OFFICE.

NIMROD W. L. BROWN, OF MARIETTA, GEORGIA.

TRAMPER FOR COTTON-PRESSES.

13,705. Specification of Reissued Letters Patent. Reissued Mar. 24, 1914.

Original No. 1,016,396, dated February 6, 1912, Serial No. 611,710. Application for reissue filed February 16, 1914. Serial No. 819,132.

*To all whom it may concern:*

Be it known that I, NIMROD W. L. BROWN, a citizen of the United States, residing at Marietta, in the county of Cobb and State of Georgia, have invented new and useful Improvements in Trampers for Cotton-Presses, of which the following is a specification.

The present invention relates to trampers for cotton presses, and particularly to steam trampers, which, as is well known, use a double acting steam cylinder, or, as is more commonly the case, a single acting steam cylinder, the tramper head being forced down by steam pressure and returned by block and tackle, or other suitable means.

The present invention relates more particularly to the controlling mechanism for the valve, which in this instance is a combined inlet and outlet valve, by which the steam pressure is handled, and has for its object to provide a valve controlling mechanism which when properly adjusted is automatic in its action, but which provides for the quick and positive stoppage of the tramper head and also for the operation of the combined inlet and outlet valve by hand, these several adjustments being readily under the control of the operator.

In order that the invention may be clear to those skilled in the art, I have illustrated it in connection with a press using a single acting steam cylinder, although the same invention is applicable to the double acting steam cylinder as well. This invention is not limited to the embodiment here shown, as this disclosure is merely illustrative, and in no sense restrictive.

In the drawings—Figure 1 is an elevation of so much of a press as will make clear the application of my invention, the controlling mechanism being shown in an operative position. Fig. 2 is a side view on an enlarged scale of the valve and its controlling mechanism. Fig. 3 is a plan view of the mechanism shown in Fig. 2 on the same scale. Fig. 4 is a view similar to Fig. 3, with the parts in a different position. Fig. 5 is a view in section on the line 5—5 of Fig. 2, looking in the direction of the arrow. Figs. 6 and 7 are views illustrating modified forms of the invention.

Referring to the parts by numbers, like numbers indicating like parts in the several views, 2 denotes a press which is provided with the usual press box and tramper. The tramper head or plunger connects with a piston reciprocable in a cylinder 3, this cylinder having at its upper end a steam pipe 4 connecting with a suitable source of steam supply by a pipe 4′, said pipe 4 also serving as an exhaust pipe for the cylinder 3. Connected to said pipe 4 at any suitable point is a valve 5, said valve serving as an inlet valve for live steam and an outlet valve for exhaust steam, such as is now commonly used. The valve 5 is actuated by the rotary movement of a valve stem 6 having fixed to it, as shown in Figs. 1 and 2, a collar 7. Immediately above the fixed collar 7 is a collar 8 adapted to rotate about the valve stem 6 or be connected thereto in a manner hereinafter described to cause the rotation of said stem. The collar 8 is held in place by a third collar 9 which contacts with the top of the loose collar 8, and is secured in an adjustable manner to the valve stem 6. The fixed collar 7 is provided with means of any suitable character to permit angular adjustment on the stem 6 to meet all conditions which may arise in connection with the proper positioning and regulating of the inlet and exhaust valve.

At its lower end, as shown in the present embodiment of the invention, the stem 6 carries a lever arm 10 adjustably secured thereto, on which arm is a latch operating handle 11 that may by means of a pin 12, or other suitable device, be locked in its acting position. The latch handle 11 connects with the latch rod 13, the upper end of which passes through the fixed collar 7 and, when thrown in latching position, engages an aperture in the under side of the loose collar 8, so that said collar 8 will be locked under these conditions to the stem 6 through the medium of the collar 7 and the latch rod 13.

Projecting from the collar 8 is a lever 14 which, at its outer end, is joined to a thrust rod 15, which thrust rod travels loosely in a crank sleeve 16 connected in any suitable way to a crank wheel 17 journaled on a bracket 18 fixed on any suitable support. The thrust rod 15 has a resilient connection with the crank sleeve 16, this being secured by interposing springs 19 and 20 on either side of the crank sleeve 16. The crank sleeve 16 is pivotally connected to the crank wheel 17 by means of a pin 17[a]. Under this arrangement it will be seen that as the crank wheel 17 rotates the thrust rod 15 is moved in substantially longitudinal direction, swinging the lever 14 about the axis of the valve stem 6, and through the latch rod 13, when thrown into engagement with the collar 8 the latch stem 6 is rotated through an angular distance sufficient to properly operate the valve, first in one direction and then in the other, thus giving at regular intervals a full travel to the valve 5, which, while in one extreme position, has its live steam port wide open and its exhaust port closed, while in the opposite extreme position the live steam port is closed and the exhaust port wide open. The rotation of the crank wheel 17 may be effected by any suitable means, the present embodiment showing a pinion 21 carried on a shaft provided with fast and loose pulleys 22 which belt to a power shaft, not shown. The pinion 21 engages teeth on the crank wheel 17, or if desired, a separate gear wheel may be employed fixed to the shaft of said crank wheel.

The angular distance traveled by the outer end of the lever 14, to which the thrust rod is pivoted, is preferably less than the diameter of the circular path traveled by the axis of the crank pin 17[a] as the crank wheel rotates, consequently some compensating connection is required between said lever 14 and the crank wheel 17 or its pin 17[a]. This compensating connection I secure by means of the springs 19 and 20 or other resilient devices located as previously described, between stops on the thrust rod 15 and the opposite ends of the crank sleeve 16, for it will be apparent that after the lever 14 has moved through its allowed angle of movement and thrown the valve 5 to its extreme position, the crank pin 17[a] still has some distance to travel before completing its semi-rotation. In passing over this distance after having closed the valve to live steam and opened the same to the exhaust, the crank sleeve 16 will compress the spring 19 until the crank pin 17[a] passes its dead center, after which the compression on the spring is relieved as said pin continues its rotation. When the crank pin 17[a] approaches the dead center on the opposite side of its axis of rotation the crank sleeve 16 engages the spring 20 and opens the valve to admit a full pressure of steam into the cylinder 3, compressing said spring as it crosses the dead center, and then releasing the same as it continues its rotation.

It is to be noted that the spring 19 is longer than the spring 20. This is due to the fact that the lever 14 should, as the tramper is now ordinarily operated, be at rest for a longer period of time when the steam pressure is cut off and the exhaust valve held open than when the steam is on with full force, and the exhaust valve held closed. In fact, under some conditions the spring 20 may be dispensed with entirely, the period of time during which the steam pressure is required being so short that the resilient connection, such as the spring 20, can be dispensed with. When the latch rod 13 is disengaged from the collar 8 it will be evident that the valve stem 6 is readily rotated back and forth by hand from the lever arm 10.

Instead of the particular compensating mechanism shown in Figs. 2, 3 and 4, modifications thereof, such as represented in Figs. 6 and 7 may be employed. In Fig. 6 the thrust rod 15[a] is pivoted directly to the crank pin 17[a] at one end and rigidly fastened at the other end to a spring rod or strip, bent back and forth transversely into folds or loops 15[b], pivotally connected to the arm or lever 14. These folds or loops 15[b] yield when the thrust rod 15[a] is placed under compression or tension during the rotation of the crank pin 17[a] and return to normal when such compression or tension is removed.

Fig. 7 shows a leaf spring 14[a] forming a continuation of the lever 14, on the end of which spring is pivoted a thrust rod 15[c], being directly pivoted to the crank pin 17[a]. In this form of the device it is preferred to make the leaf spring of two or more leaves of different lengths, as shown, so that it will be more resilient when the thrust rod moves in one direction, than when it moves in the opposite direction.

While the above description refers particularly to a rotating valve operated in connection with a single acting steam cylinder, it will be understood that I do not limit my invention to this particular type of valve, or to the single acting type of cylinder, or to steam for fluid pressure, but I claim my invention to be equally applicable to single and double acting types of cylinders, to a valve movable back and forth in rectilinear manner as well as one adapted to be operated by rotation, and I claim it to be applicable to the use of any kind of fluid pressure.

What I claim is:—

1. In a tramper for cotton presses operated by a fluid pressure cylinder, the combination with a valve for regulating the fluid pressure in the cylinder, of mechanism for actuating said valve, the same comprising a rotatable shaft, and means operated by said shaft and connected to said valve for traversing the latter from one extreme position to the other, said means including a resilient device for holding the valve a predetermined time in one of its extreme positions.

2. In a tramper for cotton presses operated by a fluid pressure cylinder, the combination with a valve for regulating the fluid pressure in the cylinder, of mechanism for actuating said valve, the same comprising a rotatable shaft, and means operated by said shaft and connected to said valve for traversing the same from one extreme position to the other, said means including a divided resilient device to hold said valve in said extreme positions for predetermined periods of time.

3. In a tramper for cotton presses operated by a fluid pressure cylinder, the combination with a valve for regulating the fluid pressure in the cylinder, of mechanism for actuating said valve, the same comprising a rotatable shaft, and means operated by said shaft and connected to said valve for traversing the same from one extreme position to the other, said means including a divided resilient device to hold said valve in one of the aforesaid positions a predetermined period and in the other position for a shorter period.

4. In a tramper for cotton presses operated by a fluid pressure cylinder, the combination with a compressed fluid inlet and exhaust valve, of a rotatable shaft and means operated by said shaft and connected with said valve for automatically traversing the same from one extreme position to the other, said means including a resilient device for holding the valve a predetermined time in one of its extreme positions.

5. In a tramper for cotton presses operated by a fluid pressure cylinder, the combination with a valve for regulating the fluid pressure in the cylinder, of mechanism for actuating said valve, the same comprising a valve stem and means connected with said stem for manually actuating said valve, a rotatable shaft, and means operated by said shaft and detachably connected to the valve stem for automatically traversing said valve from one extreme position to the other, said means including a resilient device for holding the valve a predetermined time in one of its extreme positions.

6. In a tramper for cotton presses operated by a fluid pressure cylinder, the combination with a valve for regulating the fluid pressure in the cylinder, of mechanism for actuating said valve, the same comprising a valve stem and means connected to said stem for manually actuating said valve, a rotatable shaft, automatic means operated by said shaft and detachably connected to the valve stem for traversing said valve from one extreme position to the other, and a latch device connected with the manually actuating means for locking the automatically operating means to the valve stem and unlocking the same.

7. In a tramper for cotton presses operated by a fluid pressure cylinder, the combination with a valve for regulating the fluid pressure in the cylinder, of mechanism for actuating said valve, the same comprising a rotatable shaft, and means operated by said shaft and connected to said valve for traversing the same from one extreme position to the other, said means including a device for holding the valve in one of said positions longer than in the other during each rotation of the shaft.

8. In a tramper for cotton presses operated by a fluid pressure cylinder, the combination with a valve for regulating the fluid pressure in the cylinder, of mechanism for actuating said valve, the same comprising a valve stem, means connected with said stem for actuating the valve, a rotatable crank, and a thrust rod slidably connected to said crank and connected to said valve stem.

9. In a tramper for cotton presses operated by a fluid pressure cylinder, the combination with a valve for regulating the fluid pressure in the cylinder, of mechanism for actuating said valve, the same comprising a valve stem, means connected with said stem for actuating said valve, a rotatable crank and a thrust rod slidably connected to said crank and connected to said valve stem and resilient means connected with said rod for holding the valve a predetermined time in one of its extreme positions.

10. In a tramper for cotton presses operated by a fluid pressure cylinder, the combination with a valve for regulating the fluid pressure in the cylinder, of mechanism for actuating said valve, the same comprising a valve stem, means connected with said stem for actuating said valve, a rotatable crank, a sleeve pivotally mounted on said crank, a thrust rod slidable in said sleeve and connected with said valve stem and a cushioning spring surrounding the thrust rod at one end of said sleeve.

11. In a tramper for cotton presses operated by a fluid pressure cylinder, the combination with a valve for regulating the fluid pressure in the cylinder, of mechanism for actuating said valve, the same comprising a valve stem, means on said stem for actuating said valve, a rotatable crank, means operated by said crank connected to said valve actuating means for traversing said valve from one extreme position to another, and a latch mechanism between the valve stem and its actuating means.

12. In a tramper for cotton presses operated by a fluid pressure cylinder, the combination with a compressed fluid inlet and exhaust valve, of a rotatable shaft and means operated by said shaft and connected to said valve for controlling the passage of fluid through said valve, said means including a resilient device for holding said valve in the position where the exhaust is open and the inlet closed.

13. In a tramper for cotton presses operated by a fluid pressure cylinder, the combination with a compressed fluid inlet and exhaust valve, of a rotatable shaft, and means operated by said shaft and connected to said valve for controlling the passage of fluid through said valve, said means including a resilient device for holding said valve in the position where the exhaust is open and the inlet closed, and a second resilient device for holding said valve in the position where the inlet is open and the exhaust closed.

14. In a tramper for cotton presses operated by a fluid pressure cylinder, the combination with a valve for regulating the fluid pressure in the cylinder, of mechanism for actuating said valve, the same comprising a rotatable shaft, a crank wheel on said shaft, and means operated by said crank wheel and connected to said valve for traversing the same from one extreme position to another whereby said valve when in one of said extreme positions will admit compressed fluid therethrough and in the other extreme position discharge the same after use therefrom, said means including a device for holding said valve in one of said extreme positions longer than in the other during each rotation of said crank wheel.

15. In a tramper for cotton presses operated by a fluid pressure cylinder, the combination with a valve for regulating the fluid pressure in the cylinder, of mechanism for actuating said valve, the same comprising a valve stem, latching mechanism mounted on said stem and adapted to be angularly adjustable about its axis, a vibrating arm loosely mounted on said valve stem and adapted to be secured thereto by said latching means for operating the valve, a rotatable crank, a sleeve pivotally mounted on said crank, a thrust rod pivoted to said vibrating arm and slidable in said sleeve, and a cushioning spring surrounding the thrust rod at one end of said sleeve.

16. In a tramper for cotton presses operated by a fluid pressure cylinder, the combination with a valve for regulating the fluid pressure in the cylinder, of mechanism for actuating said valve, the same comprising a rotatable shaft, automatic means operated by said shaft and detachably connected to the valve for traversing the valve from one extreme position to the other, and a manually operative device for locking the automatically operating means into operative connection with the valve and unlocking the same.

17. In a tramper for cotton presses operated by a fluid pressure cylinder, the combination with a valve for regulating the fluid pressure in the cylinder, of mechanism for actuating said valve, the same comprising a rotatable shaft, automatic means operated by said shaft and detachably connected to the valve for traversing the valve from one extreme position to the other, and a manually operative device extending below the automatically operating means for locking said means into operative connection with the valve and unlocking the same.

18. In a tramper for cotton presses operated by a fluid pressure cylinder, the combination with a valve for regulating the fluid pressure in the cylinder, of mechanism for actuating said valve, the same comprising means connected to said valve for manually actuating the same, a rotatable shaft, automatic means operated by said shaft and detachably connected to said valve for traversing the same from one extreme position to the other, and manually operative means for locking the automatically operating means into operative connection with the valve and unlocking the same.

19. In a tramper for cotton presses operated by a fluid pressure cylinder, the combination with a valve for regulating the fluid pressure in the cylinder, of mechanism for actuating said valve, the same comprising means connected to said valve for manually actuating the same, a rotatable shaft, automatic means operated by said shaft and detachably connected to said valve for traversing the same from one extreme position to the other and holding it longer in one extreme position than in the other, and manually operative means for locking the automatically operating means into operative connection with the valve and unlocking the same.

20. In a tramper for cotton presses operated by a fluid pressure cylinder, the combination with a valve for regulating the fluid pressure in the cylinder, of mechanism for actuating said valve, the same comprising a rotatable shaft, automatic means operated by said shaft and detachably connected to said valve for traversing the same from one extreme position to the other, and means connected to said valve and extending below the automatically operating means for manually actuating said valve while disconnected from said automatically operating means.

21. In a tramper for cotton presses operated by a fluid pressure cylinder, the combination with a valve for regulating the fluid pressure in the cylinder, of mechanism for actuating said valve, the same comprising means connected to said valve for manually actuating the same, a rotatable shaft, automatic means operated by said shaft and detachably connected to said valve for traversing the same from one extreme position to the other, and means for connecting the automatically operating means to the valve and disconnecting the same.

In testimony whereof I have hereunto set my hand in the presence of two subscribing witnesses.

NIMROD W. L. BROWN.

Witnesses:
CLARENCE E. POWER,
LEILA P. POWER.

Copies of this patent may be obtained for five cents each, by addressing the "Commissioner of Patents, Washington, D. C."